United States Patent [19]

Phillips et al.

[11] 4,435,476

[45] Mar. 6, 1984

[54] METHOD OF MAKING AN ABRASION RESISTANT COATING ON A SOLID SUBSTRATE AND ARTICLES PRODUCED THEREBY

[75] Inventors: Richard A. Phillips, Acton; Theodore A. Haddad, Leominster, both of Mass.

[73] Assignee: Foster Grant Corporation, Leominster, Mass.

[21] Appl. No.: 409,272

[22] Filed: Aug. 18, 1982

[51] Int. Cl.$^3$ .................. B32B 27/12; B32B 27/30; B32B 15/08; B05D 3/06

[52] U.S. Cl. .................. 428/412; 427/39; 427/40; 427/41; 428/447; 428/450; 428/474.4; 428/480; 428/522

[58] Field of Search .................. 427/39, 40, 41, 387, 427/404; 428/447, 450, 412, 480, 474.4, 522

[56] References Cited

U.S. PATENT DOCUMENTS

| | | | |
|---|---|---|---|
| 3,451,838 | 6/1969 | Burzynski et al. | 117/33.3 |
| 3,632,386 | 1/1972 | Hurst | 427/40 |
| 3,650,808 | 3/1972 | Gagnon | 117/72 |
| 3,669,720 | 6/1972 | Remer | 427/40 |
| 3,686,018 | 8/1972 | Lindblom | 427/40 |
| 3,713,880 | 1/1973 | Krekeler | 117/138.8 B |
| 3,843,399 | 10/1974 | Kaplan et al. | 117/217 |
| 3,901,994 | 8/1975 | Mehalso et al. | 428/16.3 |
| 3,953,115 | 4/1976 | French | 351/166 |
| 3,986,997 | 10/1976 | Clark | 260/37 |
| 4,018,945 | 4/1977 | Mehalso | 427/41 |
| 4,072,985 | 2/1978 | Kaganowicz et al. | 358/128 |
| 4,096,315 | 6/1978 | Kubacki | 428/412 |
| 4,123,308 | 10/1978 | Nowlin et al. | 156/272 |
| 4,137,365 | 1/1979 | Wydeven et al. | 428/412 |
| 4,225,631 | 9/1980 | Berger et al. | 427/54.1 |
| 4,277,287 | 7/1981 | Frye | 106/287.12 |
| 4,298,655 | 11/1981 | Kray | 428/412 |

FOREIGN PATENT DOCUMENTS

| | | | |
|---|---|---|---|
| 45-06433 | 4/1970 | Japan | 427/41 |
| 55-1839 | 1/1980 | Japan . | |

*Primary Examiner*—Ellis P. Robinson
*Attorney, Agent, or Firm*—Tatsuya Ikeda

[57] ABSTRACT

There is disclosed a method for providing an improved abrasion resistant coating on solid substrates such as plastic articles and solid articles prepared thereby having on the surface such abrasion resistant coating. A solid substrate is coated with an organosiloxane coating liquid, the coating is cured, and subsequently post-treated by a glow discharge to afford an abrasion resistance far superior to that obtained from organosiloxane coating liquids without glow discharge post-treatment. The organosiloxane coating liquid comprises and organosilonal and/or a partial condensation product thereof.

There is also disclosed a mirrored solid substrate such as a plastic having an improved abrasion resistance which has a glow discharge treated organosiloxane coating layer and a mirror layer deposited thereon by a vapor deposition method.

23 Claims, No Drawings

METHOD OF MAKING AN ABRASION RESISTANT COATING ON A SOLID SUBSTRATE AND ARTICLES PRODUCED THEREBY

BRIEF SUMMARY OF THE INVENTION

This invention relates to an improved scratch or abrasion resistant coating for a solid substrate and more particularly to such coatings for transparent plastic substrates. The invention also includes a method for providing an improved abrasion resistant coating which comprises coating the substrate with an organosiloxane coating liquid, curing the coating, and then subjecting the coated substrate to a glow discharge preferably in the positive column region thereof.

This invention also relates to a mirrored solid substrate having a glow discharge treated organosiloxane coating layer and a mirror layer vapor-deposited on said organosiloxane coating layer.

BACKGROUND ART

There are a large number of references relating to the preparation of an abrasion-resistant coating on a solid substrate such as a plastic material. In light of the various advantages of plastic materials such as light weight, low material cost and ease of shaping, the development of abrasion-resistant coatings for plastic materials is highly significant from a commercial standpoint. Included among those methods commonly used for such a purpose are a group of methods where a liquid coating composition is applied to a solid substrate and another group of methods where a coating layer is prepared by use of a plasma polymerization of a monomer onto the surface of a solid substrate. Various liquid coating compositions suitable for the first group of methods and various monomers suitable for plasma polymerization have been disclosed in the past. There also exist references relating to the post-treatment of a coated layer which improves or modifies the surface properties thereof.

Burzynski et al, U.S. Pat. No. 3,451,838 describes a process of coating plastics with an organosiloxane. It discloses that abrasion resistant organpolysiloxane compounds can be prepared by the hydrolysis and condensation of at least one compound embraced by the general formula $T_nSi Z_{4-n}$ where each T is independently a hydrocarbon radical such as alkyl, alkenyl and aryl and each Z is independently a hydrolyzable group such as halogen, acyloxy and aryloxy.

Krekeler, U.S. Pat. No. 3,713,880 describes a process for coating the surface of transparent thermoplastic resins with a solution of a mixture of alkyl silicate, an organosilane and an antistatic additive and thereafter subjecting the coated material to a heat treatment, said organosilane being a compound of the formula $R Si X_3$, $R_2Si X_2$ or a mixture thereof, where R is a hydrocarbon radical and X is a hydrolyzable group, namely, a halogen or a lower alkoxy group.

Gagnon, U.S. Pat. No. 3,650,808 describes a process for providing an abrasion resistant coating on a polycarbonate surface which comprises priming the polycarbonate surface with a compound of the formula $H_2NR_1Si(OR)_3$ where $R_1$ is an alkylene group, and OR is an alkoxy group of 1-4 carbon atoms, and thereafter applying to the suface a coating liquid which is produced by heating methyltrialkoxysilane or a mixture of methyl trialkoxysilane and phenyltrialkoxysilane followed by a followed by a partial condensation thereof.

Clark, U.S. Pat. No. 3,986,997 discloses a pigment-free aqueous coating composition comprising a dispersion of colloidal silica in a lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

French, U.S. Pat. No. 3,953,115 describes a process for applying an adherent, optically clear, abrasion resistant coating to plastic ophthalmic substrates which comprises (a) forming a partially hydrolyzed solution of a vinyltri(lower alkoxy) silane in a water-miscible volatile organic solvent, the silane concentration being 25-75% by weight, (b) applying a thin, uniform coating of the partially hydrolyzed solution to a clean surface of the ophthalmic lens; (c) maintaining the coated substrate in a high humidity and preferably elevated temperature environment until the silane is substantially completely hydrolyzed; and (d) dehydrating (curing) the coated substrate under low humidity conditions at an elevated temperature.

Frye, U.S. Pat. No. 4,277,287 describes an organosiloxane liquid coating comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, and a small amount of a polysiloxane polyether copolymer, at least 70 weight percent of the silanol being $CH_3Si(OH)_3$, said composition containing 10 to 50 weight percent solids.

Kray, U.S. Pat. No. 4,298,655 describes an organosiloxane coating liquid comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, a small amount of a betadicarbonyl compound, at least 70 weight percent of the silanol being $CH_3Si(OH)_3$, said composition containing 10 to 50 weight percent solids.

Suzuki et al, Japan Patent 1839/1980 describes a method of surface treatment of articles wherein the hydrolysis product of a silicon compound having a general formula $R^1C (=CH_2) C (=O) OR^2Si (OR^3)_3$ (where $R^1$ is hydrogen or methyl, $R_2$ is an alkylene group of 1-6 carbon atoms, and $R^3$ is a hydrocarbon group of 1-8 carbons or an acyl group of 1-4 carbons) is coated on a substrate and thereafter it is hardened by electron beam irradiation. Electron beam irradiation is commonly used, as is ultraviolet light, to cure coatings containing carbon-carbon double bonds. The inventors state that in order to eliminate the polymerization inhibitive effect of oxygen gas, it is preferable to conduct the electron beam irradiation under an inert gas atmosphere. The inventors state that the hardening of the coating is believed to be due to the polymerization of acrylate or methacrylate groups effected by the electron beam irradiation.

Berger et al, U.S. Pat. No. 4,225,631, describes a process for making an abrasion resistant coating on a polymeric substrate which comprises applying a coating solution of hydrolized vinyl (lower alkoxy) silane in a water miscible volatile organic solvent, curing the coated substrate, and subsequently subjecting the cured substrate to high energy radiation. It is stated in the patent that ultraviolet light, high energy electrons and gamma rays are suitable for the high energy radiation, and that ultraviolet light is preferable. Berger et al theorize that high energy radiation causes cross-linking of vinyl groups to produce a harder coating and strengthen the chemical adhesion between the coating and the substrate.

Kaplan et al, U.S. Pat. No. 3,843,399 describes a metalized video disc having an insulating layer thereon, where glow discharge is employed to coat the conductive video disc with a polymeric film to obtain a uniform tough dielectric coating which can be repeatedly contacted with a metal tipped stylus without damage. It is stated that monomers suitable for use in forming thin coatings on video discs by glow discharge polymerization include styrene; substituted styrenes; alkyl-substituted silanes such as triethylsilane, trimethylsilane; tetraethysilane, vinyltrimethylsilane and the like; alkenes and cycloalkenes; alkene-substituted benzenes such as divinylbenzene and the like; halogenated compounds such as tetrafluoroethylene, methylene chloride and the like; and polysiloxanes such as dimethylpolysiloxane and the like.

Mehalso, U.S. Pat. No. 4,018,945 describes a method of improving the long term durability of a dielectric polymer film deposited on a video disc by glow discharge polymerization of a dielectric polymer precursor such as styrene, wherein the dielectric polymer is post-treated by a glow discharge in the presence of an oxygen containing gas.

Mehalso et al, U.S. Pat. No. 3,901,994 describes a metalized disc having a dielectric coating thereon wherein a poly-p-xylylene coating is deposited on the metalized disc by a technique such as vapor deposition and then hardened by exposure to a glow discharge.

Kaganowicz et al, U.S. Pat. No. 4,072,985 describes a video disc having a dielectric layer formed from styrene in a nitrogen atmosphere in a glow discharge. It is stated that the dielectric layer has improved age deterioration resistance, wear characteristics and adhesion to a metal conductive layer. This is an example of plasma polymerization.

Nowlin et al, U.S. Pat. No. 4,123,308 describes a process for chemically bonding a poly-p-xylylene to a thermosetting resin, wherein a low temperature plasma is employed to chemically modify the surface of the poly-p-xylylene to incorporate oxygen atoms into the backbone of the polymer at its surface.

Wydeven et al, U.S. Pat. No. 4,137,365 describes an oxygen plasma post-treatment of plastic surfaces coated with plasma polymerized silane monomer wherein a plastic surface is first coated with a polymerized organosilane by use of a plasma polymerization technique conducted in vapor phase and then the coated material is post-treated with an oxygen plasma. It is stated that such oxygen plasma treatment of the coating improves its abrasion resistance.

The Wydeven et al disclosure is directed to a situation where the silane coating is prepared by a plasma polymerization of polymerizable organosilane monomer having sufficient vapor pressure to conduct polymerization in vapor phase. As examples of organosilanes suitable for their invention, there are mentioned in the patent vinyltrichlorosilane, tetraethoxysilane, vinyltriethoxysilane, hexamethyldisilazane, tetramethylsilane, vinyldimethylethoxysilane, vinyltrimethoxysilane, tetravinylsilane, vinyltriacetoxysilane, and methyltrimethoxysilane. Wydeven et al show that the oxygen-plasma post-treatment incorporates oxygen atoms to the polymer treated. There is no teaching in the patent as to plasma treatment of coating obtained from liquid compositions comprising organosiloxane compounds such as those compositions described in the aforementioned patents to Burzynski, Krekeler, Gagnon, Clark, French, Frye and Kray. In fact the inventors teach against using liquid "dip" coating composition within the scope of their invention because of problems in controlling the film thickness which in turn affects abrasion resistance and optical properties.

Kubacki, U.S. Pat. No. 4,096,315 describes a process for coating an optical plastic substrate which comprises steps of exposing the substrate to a first plasma that forms hydroxyl groups on said substrate's surface, exposing the substrate to a plasma polymerization using a silicon containing monomer, and exposing the substrate to another plasma treatment in the presence of a gas selected from noble gases, oxygen, nitrogen or air. As examples of suitable silicon containing monomers to be used in the plasma polymerization step, there are mentioned in the patent vinyltrimethylsilane, vinyltrimethylethoxysilane, vinyldimethylethoxysilane and hexamethyldisilizane.

In Chapter 4 of a treatise entitled "Thin Film Process", edited by Vossen and Kern, Academic Press, New York (1978), Yasuda comments on the chemistry involved in the plasma polymerization of three types of hydrocarbon molecules, namely, triple-bond-containing and aromatic compounds (Group I), double-bond-containing and cyclic compounds (Group II), and compounds without the aforementioned structures (Group III). The author states that under glow discharge polymerization conditions Group I forms polymers by utilizing the opening of triple bonds or aromatic structures with the least evolution of hydrogen gas, that Group Ii forms polymers via both the opening of double bonds or cyclic structures and hydrogen abstractions, the production of hydrogen gas being considerably higher than Group I compounds, and that Group III compounds polymerize primarily by hydrogen abstraction, hydrogen production being much higher than in those in Group II compounds. Based on this explanation of the plasma polymerization provess, it follows that when a vinyl-group-containing silane monomer such as vinyl trimethoxysilane, vinyltriethyoxysilane or vinyldimethethoxysilane is plasma polymerized, a substantial amount of carbon-carbon polymer backbone will be formed rather than siloxane type bonds.

Hurst, U.S. Pat. No. 3,632,386 describes an oxidative treatment, e.g., electric discharge (corona) or flame treatment of a silicone polymer release surface prepared from a silicone polymer release agent such as solvent-soluble liquid or solid curable silicone rubber polymers, whereby the release properties of the silicone polymer surface is reduced. It is stated in the patent that usually, the silicone polymer release agents are believed to have the formula:

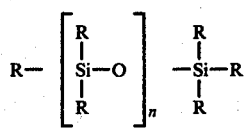

R being a mono-valent hydrocarbon radical, thus indicating that the silicon-containing polymer is substantially linear without any appreciable extent of crosslinking. The Hurst patent is not directed to abrasion resistant coatings and nothing is mentioned in the patent about the abrasion resistance of the coated surface.

The aforementioned prior art references can be broadly classified into (1) those relating to organosiloxane-type liquid coatings, (2) those relating to plasma polymerization of organosilane monomers, (3) those relating to plasma polymerization of organic monomers such as xylene and styrene (4) those relating to the plasma treatment of certain types of coated substances, namely, plasma polymerized organosilanes, plasma polymerized hydrocarbons such as xylene and styrene, and linear silicone rubber type polymers and (5) electron beam treatment of carbon-carbon double bonds existing in a coated material. It is noted that none of the aforementioned references are directed to a glow discharge treatment of organosiloxane coating obtained by applying an organosiloxane coating liquid to a solid substrate in order to improve its abrasion resistance.

Our invention is based on a discovery that when substrates that have been coated with an organosiloxane coating liquid comprising organosiloxane compounds such as those compositions described in the Burzynski, Krekeler, Gagnon, Clark, French, Frye and Kray patents are subjected to a glow discharge by placing them preferably in the positive column region of the discharge, the abrasion resistance of the coating layer is enhanced to a surprisingly large value, quite often approaching that of a common glass.

In the past it has been very difficult, if not impossible, to obtain plastic articles having abrasion resistance anywhere near the abrasion resistance of common glass. As a point of reference in discussing and evaluating the advantages of this invention the following typical abrasion resistance values as measured by a rubbing pad abrader instrument in terms of the number of cycles of an abrasive motion exerted on the surface of the test piece necessary to bring about an increase of 3% absolute in the haze value of the test piece which is expressed as a percent of scattered light in the light transmitted through the test piece. Three percent haze is the level at which haze in a lens becomes noticeable and objectionable to consumers. Details of the testing method used to evaluate the abrasion resistance of materials are described later in the specification.

TABLE I

| ABRASION RESISTANCE OF COMMON MATERIALS | |
|---|---|
| Material | Cycles for 3% Increase Haze |
| Polycarbonate | 7-11 |
| Acrylic resin | 14-19 |
| Allyl diglycol carbonate resin (CR-39 resin) | 125-150 |
| Glass | 3000-6000 |

It has also been discovered in this invention that the glow discharge need not be conducted in a special atmosphere and that any gas or vapor may be used as a glow discharge medium. This has significant commercial advantages when the inventive treatment is applied to the commercial treatment of, for instance, a large number of organosiloxane coated acrylic lenses where a large amount of water vapor is released from the lenses at low pressure and it can be used as a glow discharge medium without any substantial addition of a special gas such as oxygen. The elimination of the need for the addition of an extraneous gas not only saves the material cost but also reduces the manufacturing cost, because such addition of a gas to the glow discharge chamber leads to an increased load for the vacuum pump system for the chamber. The abrasion resistance of coated plastic articles obtained according to this invention is much larger than the abrasion resistance of coated plastic articles obtained by the conventional method involving the application of an organosiloxane type coating liquid (but without a glow discharge post-treatment), the abrasion resistance obtained by a method involving a plasma polymerization of an organosilane plus a plasma post-treatment thereof, or the abrasion resistance obtained by a plasma polymerization of a hydrocarbon molecule plus a plasma post-treatment thereof.

Additionally, it has been discovered that the abrasion or scratch resistance of mirrored coatings may be substantially improved by the use of this invention. In the past when a mirrored coating was applied to a plastic substrate, the abrasion resistance of the resultant product was generally lower than the abrasion resistance of the substrate. It has been found that this deterioration of the abrasion resistance is not encountered if the substrate is coated with an organosiloxane coating and treated with a glow discharge prior to mirrorizing.

DISCLOSURE OF THE INVENTION

There is described an improved abrasion resistant coating sometimes called a "hard-coat" and a method of providing an improved abrasion resistant coating on various solid substrates. Substrates such as wood, metals and plastics can be treated according to this invention. Plastic materials that can be improved and treated by the invention method are exemplified by substances such as allyl diglycol carbonate resins (CR-39 resins), polycarbonates, acrylic resins, polystyrene, polyamides, polyesters and polyvinylchloride. The method of the invention comprises first coating the article with an organosiloxane coating liquid, curing the coating, and further treating it with a glow discharge in order to enhance its abrasion resistance. The method of this invention is particularly useful for preparing improved abrasion resistant spectacle lenses. Any common gas or vapor such as air, nitrogen, oxygen, water, carbon dioxide or mixtures thereof may be used as a medium for the glow discharge treatment. The glow discharge is usually conducted with a high voltage in the 1–5 kilovolt range at a preferred pressure of typically 5–50 microns for a period of 5–60 minutes.

There is also disclosed a mirrored solid substrate having an improved abrasion resistance which has a glow discharge treated organosiloxane coating layer and a mirror layer prepared by a vapor deposition of a metal on the glow discharge treated organosiloxane coating layer.

DETAILS OF THE INVENTION

The method of this invention for producing an improved abrasion resistant coating comprises coating a solid substrate with a liquid comprising an organosiloxane compound, curing the liquid by conventional means, and exposing the coated substrate to a glow discharge post-treatment. The method of this invention is particularly suitable for commercial-scale production of hard coated articles, because among other things, the initial coating of the article with a coating liquid is generally more amenable to commercial-scale production than the plasma polymerization method. Furthermore, the abrasion resistance of the coated articles obtained by this invention is much higher than the abrasion resistance obtained by the prior art method of Wydeven, or Mehalso involving a plasma polymerization of an organosilane or a hydrocarbon monomer and an oxygen plasma post-treatment of the coated layer. It is also much higher than the abrasion resistance obtained by the prior art method involving the application to a solid substrate of an organosiloxane coating liquid but not a glow discharge post-treatment of the coated layer.

As used in this invention the term "organosiloxane coating" or "organosiloxane coat" is intended to mean an abrasion resistant coating comprising siloxane bonds (namely, $(Si—O—Si)_n$ bonds) formed by the condensation reaction between organosilanol molecules. The organosilanol molecule can generally be obtained from organosilane compounds having one or more hydrolyzable groups attached to silicon atom such as alkoxy, acyloxy, aryloxy or halogen, but it is usually obtained by the hydrolysis of an alkoxy-group-containing organosilane of the formula $R'_mSi(OR)_{4-m}$, where m is 1 or 2, preferably 1, and R' and R are each independently a hydrocarbon radical or mixtures thereof. A common type of coating liquid which affords such organosiloxane coatings comprises an organosilanol of the formula $R'Si(OH)_3$ and/or a partial condensation product thereof. Such coating liquids are disclosed, for instance, in the Clark (U.S. Pat. No. 3,986,997), French (U.S. Pat. No. 3,953,115), Frye (U.S. Pat. No. 4,227,287), Kray (U.S. Pat. No. 4,298,655) and Burzynski (U.S. Pat. No. 3,451,838) patents. The disclosures of these prior art references are hereby incorporated by reference. For the purposes of this application, a coating liquid suitable for this invention to obtain said "organosiloxane coating" which comprises an organosilanol and/or a partial condensation product thereof shall be termed an "organosiloxane coating liquid". Although the details of the chemistry involved in the formation of the silicon containing hard coating layer is not clear, it appears that a substantial amount of Si—O—Si bonds are formed during the coating process including the curing stage. In many cases there is a high degree of crosslinking and/or incorporation of colloidal silica.

Any standard method of applying the liquid coating composition may be used in the practice of this invention. Examples of such methods are flow coating, dip coating, spray coating, spin coating, etc.

A common method of applying such liquid coating compositions to substrates is to immerse the articles in the liquid composition and thereafter withdraw them from the bath at a predetermined rate. It is usually advantageous to thoroughly clean the substrate surface prior to the application of the coating liquid in order to obtain better coatings. Conventional cleaning liquids such as aqueous detergent solutions and volatile fluorocarbons may be used for this purpose. After withdrawal from the bath, the articles are carefully dried in a dust-free atmosphere and thereafter thermally or U.V. cured. Thermal curing is usually conducted at an elevated temperature such as in the range of 50°–200° C. depending upon the heat distortion temperature of the substrate. This coating method is commonly called "dip-coating" and it is very suitable for a large scale production of hard-coated plastic articles. The dip-coating method is generally more suitable than plasma polymerization for large scale production of plastic hard coat articles for various reasons including process costs and equipment costs. The typical thickness of a coating layer obtained by dip-coating method is about 1–3 microns.

Plastic substrates suitable for the method of this invention include aliphatic and aromatic polycarbonates such as allyl diglycol carbonate and poly(bisphenol-A carbonate), acrylic resins such as poly(methylmethacrylate), polystyrene, polyamide, polyesters and cellulose esters such as cellulose acetate butyrate (CAB). For sunglass applications polycarbonate and acrylic resins are particularly suitable.

The general technique of glow discharge is well-known in the art. In this invention the gaseous medium used for the glow discharge is not limited to any specific molecule such as oxygen. It has been found in this invention that the residual gas remaining in the glow discharge chamber after pumping the system can conveniently be used as such without introduction of any specific gas such as oxygen to the system. As mentioned earlier, this is a substantial commercial advantage because it eliminates the need to supply any extraneous gas to the system and hence reduces the pump load and consequently reduces the apparatus costs. It has also been found that glow discharge treatments under oxygen, nitrogen, air, carbon dioxide, and water generally give substantially the same enhancement of the abrasion resistance of the coating material. The vapor pressure of the gas in the glow discharge chamber can be 5–150 microns, preferably in the range of 5–50 microns and more preferably in the range of 5–30 microns.

The discharge may be conducted in either DC or in AC mode but it is more convenient to use DC mode of operation. In the DC operation the typical voltage is 1–5 kilovolts. The plastic articles to be treated should preferably be placed within the positive luminous region. The time period required for the glow discharge varies depending on various factors such as the spacing between the adjacent articles and the pressure of the gas within the chamber. In a typical treatment the time is 5–60 minutes.

The operating conditions required to achieve the effects of this invention can vary depending upon the design of the equipment. Factors entering into these equipment variables include electrode geometry, the gas pressure within the chamber, the discharge pathlength, the value of the applied voltage, which is in turn dependent upon the electrical constants of the power supply, and the number of articles or the amount of surface area requiring treatment. A comprehensive discussion of electrical discharges in gases at low pressure such as is used in the practice of this invention may be found in the text: "Vacuum Deposition of Thin Films", L. Holland, F. Inst. P., (John Wiley & Sons Inc., New York—1958). The term "glow discharge" is intended to mean an electric discharge in a vacuum at a pressure of about 5 to 150 microns created by an effective voltage. The term "glow discharge treatment" or "treated in a glow discharge" is intended to mean treating an article in a glow discharge preferably in the positive column region thereof for an effective time.

In a laboratory vacuum chamber used in this work it was found that optimum abrasion resistance was attained when a coated acrylic lens was exposed to a glow discharge conducted at a voltage of 1.5 kv, a current of about 40 milliamperes, at a pressure of 5–20 microns and for a time of 5 minutes. This work was done using a planetary substrate holder located approximately nine inches from the cathode. In the laboratory chamber, it was found that the pressure could be varied considerably between 5 and 150 microns with improved results being obtained over the range. However, it is believed that for each of operation, the operating pressure should be no higher than about 50 microns.

In a larger unit, an operating pressure of 10 microns was found to produce best results when the plastic substrate was exposed to a water vapor glow discharge, with the operating voltage at 1.5 kv. and the current at 400–500 milliamperes.

Abrasion resistance of a plastic is an important property in various applications such as sunglass lenses and glazing. Abrasion resistance of a surface may be evaluated in many ways. In the area of sunglass lenses a common practice is to place on a convex surface of a sunglass lens an object having a concave surface which matches the convex surface of the lens. An abrasive powder is placed between the two surfaces and the concave surface is made to reciprocate around a vertical axis under a prescribed weight load. This simulates wiping a lens with a cloth containing dust or dirt particles which is the main cause of scratches in sunglass or ophthalmic lenses. Generally as the number of cycles increases, the extent of haze formation on the surface also increases. A common procedure is to express results of the test in terms of percent increase in haze after a certain number of cycles.

In the sunglass and opthomalic industry the above abrasion resistance test is conducted using devices known as a rubbing pad abrader and a hazemeter. A detailed description of the test (hereinafter called the "rubbing pad abrader test") used in this application is as follows:

Abrader Description

The rubbing pad abrader consists of 1/20 H.P. AC motor, coupled to a Zeromax variable speed transmission which is joined by means of an adjustable eccentric joint, steel rod and two ball joints to a moveable steel table in a sliding fit holder. The steel table is attached to the stroking arm through a ball joint and the other end of the stroking arm is fitted with a ball joint and pin. The pin carries the loading weight (100 grams) on one end and the abrading pad holder on the other end. The pad holder with the abrading pad in place (pads received are self-adhesive after backing is peeled off) has the same curvature as the sample being tested. The sliding steel table is used to dampen vibrations in the drive mechanism and prevents them from being transmitted to the stroking arm.

Procedures for Hazemeter and Photometric Unit

The hazemeter is described in ASTM D1003-52 and its operation is described below. The hazemeter is turned on and allowed to warm up for a minimum of 30 minutes to allow the instrument to stabilize. The zero point of the Gardner Digital Photometric Unit (Mod. PG5500) is determined by adjustment of the zero point control with no sample in place and the lid shut. When digital display indicates 0.00, the correction for stray light has taken place and the instrument is zeroed to air.

The test specimen must be washed with a mixture of deionized water and a detergent (Liqui-nox) then dried using clean air or dry nitrogen. With the sample to be abraded in place the calibrate control unit is adjusted until the digital display indicates 100.00. This step corrects for the transmission of the sample. The sample is removed and the zero point (0.00) rechecked. If the zero point must be readjusted, then the steps of the proceeding two paragraphs have to be repeated until the zero point no longer needs adjustment. Once the zero point and 100% transmission have been equalized that sample is ready for the initial haze reading. This is the digital readout.

Procedures for Abrading Samples

The felt pad with the adhesive back is attached to the correct holder which matches the curve of the sample to be abraded. A pre-measured amount of grit (Grit #600, Silicon Carbide, Norton Company, Worcester, Mass.) is placed on the felt pad and spread over the surface of the pad evenly. The holder is then lightly tapped on the side until the abrasive grit settles into the felt pad.

The pad and holder is then positioned on the ball socket of the abrader arm and carefully lowered onto the sample to be abraded. The abrader counter is then set to a predetermined amount of cycles depending on the material to be tested. The abrader is turned on and the sample abraded the desired number of cycles. Once the sample has been abraded for the predetermined amount of cycles, the sample is removed from the abrader and washed and dried.

The sample is then placed in the hazemeter and a new haze reading to establish the increase in haze over the initial haze reading taken. This is done bringing the digital readout of the haze meter to 100.0 reading with the sphere in a cocked position, then back to the straight through position for the haze reading.

A typical set of readings would be as follows:

| Material | Initial Haze | Cycles | 2nd Reading | % Haze Increase |
|---|---|---|---|---|
| CR-39 Resin (15% PMMA) | 0.2% | 150 | 3.4% Haze | 3.2% |

It has been discovered in this invention that the glow discharge treatment of the coating layer prepared from an organosiloxane coating liquid affords a surprising increase in abrasion resistance. The resultant hard-coated plastic articles have abrasion resistance which is much greater than the typical abrasion resistance obtained by the dip coating of plastic articles with organosiloxane coating liquid. The degree of improvement of the abrasion resistance is so large that the resultant abrasion resistance approaches that of common glass. Furthermore, the abrasion resistance of plastic articles obtained by this invention is much greater than those obtained by a process comprising a plasma polymerization of an organosilane or hydrocarbon monomer onto the surface of a plastic article and an oxygen post-treatment of the coating layer.

It has also been discovered in this invention that mirrored plastic articles having a superior abrasion resistance can be obtained if the mirroring process is conducted subsequent to the coating of the plastic articles with an organosiloxane coating liquid, air and thermal curing thereof and plasma pot-treatment thereof. The resultant abrasion resistance is substantially higher than that obtained by subjecting an uncaoted plastic article to a glow discharge treatment and a mirroring process.

The method for providing a mirror layer on solid articles such as plastics is well known in the art. Typically, a metal such as chromium or aluminum is used for the mirror material. The mirroring process is conducted inside a high vacuum chamber. The mirror material is vaporized, for instance, by electron beam bombardment or resistance heating. The articles to be mirrored are placed at suitable locations within the vacuum chamber in order to obtain vacuum deposition of the mirroring material efficiently and uniformly.

The following general glow discharge treatment procedure was used in the Examples of this application. Deviations from this procedure are noted in the specific Examples. Four vacuum chambers were used to treat the dip coated substrates of the Examples.

The first vacuum chamber was a laboratory unit equipped with a diffusion pump and a mechanical vacuum pump connected in series. Coated substrates were placed in a holder located about four to ten inches from the cathode. The vacuum chamber was evacuated to a pressure in the range of 5 to 150 microns and 1 to 5 kv. was applied to the electrode to induce a glow discharge. In this laboratory unit, treatment times of two to about thirty minutes were employed and it was determined that five minutes of treatment produced a satisfactory product having an abrasion resistance of approximately 1000 cycles which is approaching glass. In that experiment, the voltage was approximately 1.5 kv. and the current was about 45 milliamperes. The optimum distance of the substrate from the cathode was determined to be about 4.5 inches, said location being within in the positive glow region of the plasma.

In a second unit, experiments were conducted on a larger scale to determine the operating parameters of the process. This unit had a capacity to accommodate 6,000 lens blanks mounted on trays which were in turn mounted on a carrier. Nine rod-shaped cathodes were spaced in parallel to each other between the lens blanks and the carrier upon which they were mounted. The carrier acted as an anode and the horizontal surface upon which the trays holding the lens blanks rested was covered by a mesh screen. The interior wall of the vacuum chamber and all other parts existing therein were made of stainless steel. This unit was equipped with a Roots blower connected in series to a Stokes mechanical pump. In this unit, the lens surfaces were placed perpendicular to the longitudinal axis of the cathode.

The large scale unit was evacuated using the mechanical pump to remove the bulk of the vapor from the vacuum chamber to a low vacuum. After a pressure of approximately 20 torr was reached, the Roots blower was actuated and the two units operated in series until a pressure of about 20 microns was attained. The glow discharge was then initiated and the substrates were exposed to the glow discharge for 0.25 to one hour.

The third unit was a small bell-jar type vacuum chamber and the fourth unit was a cylindrical vacuum chamber having a diameter of about three feet.

The following examples are presented solely for the purpose of illustrating the invention. They should not be construed as limiting the scope of this invention. In the following examples unless specifically indicated otherwise, the plasma medium for the glow discharge treatment was the residual gas or gases (primarily a mixture of air and water vapor) remaining in the chamber after it was evacuated to the operating pressure.

EXAMPLE I

A number of commercially available lenses were secured and tested for abrasion resistance, using the rubbing pad abrader and hazemeter test. The increase in haze percentage measured on the abraded samples generally after 150 cycles. The results were as follows:

| Lens Material | Coating | Increase in Haze Percentage |
|---|---|---|
| Allyl diglycol carbonate resin (CR-39) | None | 2.8–3.0 |
| Allyl diglycol carbonate resin (CR-39) | American Optical Permalite* | 2.3 |
| Allyl diglycol carbonate resin (CR-39) | 3M Armalite - RLX | 1.0 (2.6 after 300 cycles) |
| Acrylic resin | None | 3.0 (after 15 cycles) |
| Acrylic resin | Mitsubishi UAR | 2.3–3.6 |
| Acrylic resin | G.E. SHC-1200* | 3.2 |
| Acrylic resin | Dow ARC* | 3.2–3.6 |
| Acrylic resin | DuPont SAR | 3.2–3.6 |
| Acrylic resin | R.C.A. | 11–13 |
| Polycarbonate | None | 3.0 |
| Polycarbonate | Dow ARC* | 2.8–3.0 |
| Polycarbonate | G.E. - SHC-1200* | 2.6 |
| Polycarbonate | R.C.A. | 16–26 |

*organosiloxane coatings

These results show that allyl diglycol carbonate resin (a widely used sunglass and ophthalmic lens material) has substantially better abrasion resistance than does acrylic resin. The various coatings available on acrylic resin generally elevate the abrasion resistance of the substrate to that approximately of allyl diglycol carbonate resin but none come anywhere close to glass.

EXAMPLE II

Polycarbonate, acrylic and CR-39 lenses were coated with an organosiloxane coating liquid sold by General Electric Company under the designation SHC-1200. The lenses were dip-coated with the organosiloxane coating liquid, air cured and then thermally cured at 185° F. The thermally cured lenses were then placed in a laboratory vacuum chamber and treated with a glow discharge under the following conditions:

Temperature: ambient
Pressure: 30 microns
Time: 5 minutes
Voltage: 1.5 kilovolts
Current: 35 milliamperes The glow discharge had a purplish color indicating that the plasma medium comprised water and air remaining in the chamber after it was evacuated to the operating pressure. The lenses with the glow discharge treated organosiloxane coatings were then tested for abrasion resistance and the percent increase in haze measured. The results are as follows:

| Lens Material with SHC-1200 | Percent Increase in Haze | Cycle |
|---|---|---|
| Allyl diglycol carbonate resin (CR-39) | 0.7 | 150 |
| Acrylic Resin | 0.3 | 150 |
| Acrylic Resin | 2.9–3.3 | 1150 |

Comparison of the above results with those of Example I shows a marked increase of the abrasion resistance of the organosiloxane coated lens afforded by the glow discharge post-treatment of organosiloxane coatings according to the method of this invention. Comparison of the above results, particularly the third item in the table with aforementioned Table I shows that the present invention affords coatings having an abrasion resistance approaching that of common glass.

EXAMPLE III

Acrylic lenses having an organosiloxane coating were processed in the laboratory vacuum chamber with different gases as the major constituent. All runs were made at 20 micron chamber pressure and for five minutes. The results are expressed in terms of the increase of haze percentage after 125 cycles of abrasion.

| RUN | % Haze Increase | Gas |
|---|---|---|
| A | 0.2 | Nitrogen purge |
| B | 0.1 | " |
| C | 0.2 | " |
| D | 0.0 | Air purge |
| E | 0.2 | " |
| F | 0.3 | " |
| G | 0.3 | " |
| H | 0.3 | " |
| I | 0.2 | Water vapor |
| J | 0.3 | " |

The above results indicate that nitrogen, air and water vapor give comparable improvements when they are used as a medium for the glow discharge treatment.

EXAMPLE IV

Part (A) Organosiloxane coatings.

Plastic substrates having organosiloxane coatings were obtained from different sources and given a glow discharge treatment under the conditions described in Example II. The effectiveness of the glow discharge treatment for increasing the abrasion resistance of the organosiloxane coatings is summarized below in terms of the percentage increase in haze after 125 cycles of surface abrasion using the rubbing pad abrader test.

| | | | % Haze Increase | |
|---|---|---|---|---|
| Run | Substrate | Coating | Control | After Treatment |
| A | Acrylic | G.E. SHC 1200 | 2.7% | 0.2% |
| B | Acrylic | Dow ARC | 3.3% | 0.7% |
| C | Acrylic | American Optical Permalite (tintable) | 2.9% | 0.1% |
| D | Acrylic | Toray (non-tintable) | 4.0% | 0.9% |
| E | Polycarbonate | Owens-Illinois O.I. 650 | 6.7% | 0.4% |
| F | Polycarbonate | G.E. SHC-1200 | 3.7% | 0.7% |

Part (B) Organic coatings.

| | | | % Haze Increase | |
|---|---|---|---|---|
| Run | Substrate | Coating | Control | After Treatment |
| G | Polarized Sheet (Source 1) | Melamine Formaldehyde | 3.0%* | 2.9% |
| H | Polarized Sheet (Source 2) | Ethylene Glycol Dimethacrylate | 3.2% | 5.9% |
| I | Polarized Sheet (Source 1) | Polyurethane | 1.4% | 6.3% |

*after 35 cycles

The results of Part (A) show that all of the organosiloxane coatings improved in abrasion resistance after the glow discharge treatment, whereas the results of Part (B) show that the abrasion resistance of the organic coatings did not improve after the glow discharge treatment.

Light-polarizing sheets (polarized sheets) having different organic type abrasion resistant coatings were subjected to the glow discharge treatment and the abrasion resistance tested in the same manner as Part (A). The polarized sheets obtained from two sources had a central polyvinylalcohol layer and, on both sides thereof, a cellulose acetate butyrate layer.

EXAMPLE V

Molded acrylic lenses were vacuum deposited with poly-p-xylylene coatings substantially in accordance with the method of Mehalso et al U.S. Pat. No. 3,901,994. The lenses were coated with two thicknesses; (a) 2 microns (lenses C and D); and (b) 4 microns (lenses C and E). Samples of each thickness were subjected to the glow discharge treatment set forth in Example II of this application. The abrasion resistance of these samples (increase of haze after 125 cycles of abrasion) is summarized below. Sample A is an acrylic lens coated with the aforementioned organosiloxane coating liquid SHC-1200 and air and thermally cured as described in Example II. Sample B is an acrylic lens coated with SHC-1200, air and thermally cured and glow-discharge treated as described in Example II. The plasma medium was the residual gas remaining in the chamber after evacuating it to the operating pressure.

| Lens | Coating | Glow Discharge | % Increase in Haze |
|---|---|---|---|
| A | Organosiloxane | No | 2.8 |
| B | " | Yes | 0.1 |
| C | poly-p-xylylene | No | 54.2 |
| D | " | Yes | 30.2 |
| E | " | No | 62.9 |
| F | " | Yes | 12.7 |

The above results show that the poly-p-xylylene coatings, even after the glow discharge treatment, generally have abrasion resistance lower than that of a conventional organosiloxane coating prepared from an organosiloxane coating liquid but not post-treated with glow discharge.

EXAMPLE VI

Seven acrylic lenses were coated with vinyltrimethoxysilane using a radio frequency plasma polymerization technique substantially in accordance with the procedures set forth in U.S. Pat. No. 4,137,365. The time and pressure of the plasma polymerization process was varied to produce a range of results. Only three of the samples had a coating thickness comparable to that described by Wydeven. Those three samples were cut in half, a control half was tested for abrasion resistance and the other half was treated in a glow discharge for five minutes in the planetary configuration under a pressure of 20 microns, and a voltage of 2 kilovolts, and its abrasion resistance was measured. The results are as follows:

| Run | Coating Thickness | % Haze Increase - 125 cycles | |
|-----|-------------------|---------|----------------|
|     |                   | Control | Glow Discharge |
| A | 0.7 microns | 16.3 | 7.3 |
| B | 0.5 microns | 14.4 | 9.6 |
| C | Thin (<0.25 microns) | 10.0 | 10.0 |

For comparison, the percent haze increase in an acrylic lens having an organosiloxane coating of 1.5-2.0 microns thickness and treated with a glow discharge was 0.1%. An uncoated acrylic lens given the same abrader test showed a percent increase in haze of 13.4%. These results show that although there can be some improvement in the abrasion resistance of plasma polymerized vinyltrimethoxysilane the result does not approach that of the glow discharge treated organosiloxane coatings.

EXAMPLE VII

Acrylic lenses were coated with the organosiloxane coating liquid used in Run (B) of Example IV, (see Clark U.S. Pat. No. 3,986,997) and the effect of the cure time upon the abrasion resistance was studied. These lenses were annealed, coated and cured for 2 hours, 4 hours, 8 hours, 12 hours and 16 hours. The samples were tested on one date and then retested several days later to confirm the original abrasion resistance results. The results are summarized below:

| | Coating - Dow ARC | | |
|---|---|---|---|
| | | % Haze Buildup | |
| Cure Time | Cycles | Test No. 1 | Test No. 2 |
| 2 hours | 125 | 3.0-3.0 | 2.8-2.9 |
| 4 hours | 125 | 2.8-3.0 | 3.0-3.1 |
| 8 hours | 125 | 2.7-2.8 | 2.9-3.0 |
| 12 hours | 125 | 2.7-2.7 | 2.7-2.9 |
| 16 hours | 125 | 3.5-3.5 | 3.3-3.5 |

A similar experiment was also conducted using the aforementioned organosiloxane coating liquid SHC-1200 sold by General Electric Co. No significant improvement of abrasion resistance was observed after four hours of curing.

The above results indicate that in the absence of the glow discharge treatment according to this invention, there is a certain limit to the abrasion resistance obtained by the organosiloxane coatings regardless of the cure time and that the method of this invention affords an abrasion resistance far superior to those obtained by such a conventional method.

It is believed that the glow discharge post-treatment step according to this invention accomplishes something more than a mere completion of the conventional curing of the organosiloxane coating liquid.

EXAMPLE VIII

This example illustrates how one can vary operating conditions for the glow discharge and still obtain the improved abrasion resistance coatings of this invention. Acrylic lenses having an organosiloxane coating were loaded into the large vacuum chamber previously described. Only a small number of lenses were loaded for these experiments, approximately two full trays, or 480 lenses. Random samples were taken from each experiment after the glow discharge treatment and tested for abrasion resistance. The operating conditions and results are summarized below:

| Run | Pressure Microns | Time Mins. | Voltage kv. | Current mA | Average % Haze Incr. |
|---|---|---|---|---|---|
| A | 5 | 30 | 2.4 | 320 | 0.03 |
| B | 10 | 30 | 2.2 | 350 | 0.40 |
| C | 20 | 30 | 1.6 | 390 | 0.77 |
| D | 40 | 30 | 1.0 | 450 | 1.3 |

This data indicates that in this equipment, the optimum working pressure is between 5 and 10 microns.

EXAMPLE IX

A small bell jar chamber was used to obtain a comparison between the effects of an AC voltage and a DC voltage. The AC voltage source was a transformer rated at 10 kv at 23 mA output. Regulation with this transformer was difficult. The DC voltage was obtained from the power supply of the small vacuum chamber unit previously described. The chamber atmosphere was the residual gas remaining after evacuation of the chamber to the operating pressure and it was predominantly water vapor. Acrylic lenses coated with the General Electric SHC 1200 organosiloxane coating liquid were used in this experiment.

| Run | Pressure Microns | Applied Voltage kv | Treatment Time min. | Haze Increase 125 cycles |
|---|---|---|---|---|
| A | 40-50 | 10 AC | 4 | 1.2 |
| B | 40-50 | 10 AC | 4 | 1.1 |
| C | 40-50 | 10 AC | 4 | 1.7 |
| D. | 100 | 10 AC | 5 | 1.7 |
| E | 100 | 10 AC | 5 | 1.3 |
| F | 100 | 0.7 DC | 5 | 1.3 |
| G | 30-78 | 0.7 DC | 5 | 0.7 |
| H | 70-100 | 0.7 DC | 5 | 0.8 |
| I | 55-150 | 0.7 DC | 5 | 0.9 |

The results show that the process works with either AC or DC but that DC is the preferred embodiment.

EXAMPLE X

A series of runs were conducted to determine the abrasion resistance of mirrored plastic lenses. Acrylic and polycarbonate lenses were coated with the aforementioned organosilane coating liquid SHC-1200, air and thermally cured in the manner described in Example II. The cured lenses were glow discharge treated in a cylindrical chamber of about three feet in diameter under 10-15 micron pressure of a gaseous matter (primarily water and air) for three minutes with 2.5 kv of DC voltage. The post-treated lenses were then subjected to an electron beam deposition (mirroring) process conducted in the same vacuum chamber used for the glow discharge treatment. Chromium metal was used as the mirroring material and the electron beam deposition conducted under a vacuum of $10^{-4}$-$10^{-5}$ torr range for approximately a few minutes in order to obtain one of two thicknesses: one called "regular mirror" having a thickness of about 150 Angstrom and the other called "light mirror" having a thickness of about 60 Angstrom. For the sake of comparison, the abrasion resistance of a mirrored glass prepared by an electron beam deposition of chromium over a glass was also evaluated. Also evaluated for the sake of comparison was the abrasion resistance of mirrored lenses obtained by subjecting uncoated acrylic, polycarbonate and allyl diglycol carbonate lenses to the glow discharge treatment and the mirroring process described above. The results are summarized in the table below, where the term "coated" means dip-coated with the above mentioned coating liquid, air and thermally cured and glow discharge treated in the manner described above.

|  | Regular MIRROR | | LIGHT MIRROR | |
| --- | --- | --- | --- | --- |
|  | Cycles | % Haze Increase | Cycles | % Haze Increase |
| Uncoated acrylic | 50 | 17.6% | 50 | 16% |
| Uncoated polycarbonate | 50 | 18.9% | 50 | 15.1% |
| Uncoated allyl diglycol carbonate | 50 | 2.1 | 50 | 3.8 |
| Coated acrylic | 125 | 0.2% | 125 | 0.3% |
| Coated polycarbonate | 125 | 0.4% | 125 | 0.0% |
| Glass | 125 | 0.8% | 125 | 1.0% |

The results of this experiment show that the organosiloxane coatings treated in accordance with this invention produce superior mirrored lenses. Note that uncoated acrylic, polycarbonate, and allyl diglycol carbonate lenses exhibit no such improvement.

It is noticed that just as glow discharge treatment of uncoated acrylic, polycarbonate and allyl diglycol carbonate resins does not bring out any substantial improvement of abrasion resistance, no substantial improvement of abrasion resistance is obtained by subjecting these plastic materials to a glow discharge treatment and a mirroring process unless the materials are previously coated with organosiloxane coating.

EXAMPLE XI

Acrylic lenses coated in the manner described in Example II were subjected to a glow discharge treatment under different gaseous atmospheres. The laboratory vacuum chamber was used for these experiments and a free flow of gas through the chamber was maintained during the experiments. All experiments were conducted at a voltage of two kilovolts and except for Run A at a pressure of 20 microns. Run A was conducted at a pressure of 10 microns.

After the glow discharge treatment the samples were tested for abrasion resistance by abrading them until a three percent increase in haze was observed. The number of cycles required to produce this percent haze increase and the operating conditions for the experiments are set forth below:

| Run | Gas | Time Min | Cycles |
| --- | --- | --- | --- |
| A | Nitrogen | 20 | 1000 |
| B | Air | 5 | 1900 |
| C | Nitrogen | 5 | 1000-1375 |
| D | Carbon Dioxide | 5 | 1500-2500 |
| E | Nitrogen | 10 | 1125 |
| F | Nitrogen | 20 | 1000-3000 |

These experiments show that any gas may be used as the plasma medium and that the abrasion resistance of the treated lenses approaches that of common glass.

As is apparent from the foregoing description of the invention the process of this invention has been found to improve the abrasion resistance of articles coated with G.E. SHC-1200 liquid to an unequaled high level. It works well for numerous other organosiloxane coatings. It does not appear to work well on organic coatings, plasma polymerized p-xylylene, or plasma polymerized vinyltrimethoxysilane.

Mirrored lenses having surprisingly high abrasion resistance can be obtained if the substrate contains a plasma-treated organosiloxane coating. Mirroring of plastic articles not having plasma-treated organosiloxane coating does not afford such a high abrasion resistance.

The process appears to involve something other than a mere completion of the conventional curing of organosiloxane coating since extended conventional cures of the organosiloxane coatings do not improve their abrasion resistance.

The improvement of abrasion resistance is independent of the gas present in the discharge chamber, and the glow discharge treatment is most effective when the substrate is placed in the positive column of a DC discharge at low pressures.

What is claimed is:

1. A method of improving the abrasion resistance of cross-linked organosiloxane coating, said coating having been prepared by applying to a solid substrate an organosiloxane coating liquid comprising organosilanol molecules of the formula $R'_mSi(OH)_{4-m}$ or a precursor of said organosilanol or a partial hydrolysis product thereof, where m is 1 or 2 and R' is each independently a hydrocarbon radical and by curing the resultant coating to obtain an abrasion resistant, cross-linked organosiloxane coating, which method comprises a glow discharge treatment of said cross-linked organosiloxane coating under a pressure range of from about 5 to about 150 microns.

2. The method as defined in claim 1 wherein the glow discharge treatment is conducted under a pressure within the range of 5–50 microns.

3. The method as defined in claim 1 wherein m is 1.

4. The method as defined in claim 3 wherein R' is methyl.

5. The method as defined in claim 1 wherein R' is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

6. The method as defined in claim 1, wherein the solid substrate is a plastic material.

7. The method as defined in claim 6 wherein the plastic material is selected from the group consisting of acrylic resin, polycarbonate resin, allyl diglycol carbonate resin, polyester resin, polyamide resin, polystyrene resin and cellulose ester resin.

8. The method as defined in claim 7 wherein a mirror layer is deposited on said glow discharge treated, cross-linked, organosiloxane coating.

9. A solid substrate coated with an abrasion-resistant cross-linked organosiloxane coating comprising the cross-linked condensation product of organosilanol molecules of the formula $R'_mSi(OH)_{4-m}$ or a precursor of said organosilanol or a partial hydrolysis product thereof, where m is 1 or 2 and R' is each independently a hydrocarbon radical, wherein said organosiloxane coating has been glow discharge treated at a pressure of 5–150 microns subsequent to condensation and cross-linking.

10. The solid substrate as defined in claim 9 wherein the glow discharge treatment is conducted under a pressure within the range of 5-50 microns.

11. The solid substrate as defined in claim 9 wherein m is 1.

12. The solid substrate as defined in claim 11 wherein R' is methyl.

13. The solid substrate as defined in claim 9 wherein R' is selected from the group consisting of alkyl radicals of 1 to 3 inclusive carbon atoms, the vinyl radical, the 3,3,3-trifluoropropyl radical, the gamma-glycidoxypropyl radical and the gamma-methacryloxypropyl radical, at least 70 weight percent of the silanol being $CH_3Si(OH)_3$.

14. The solid substrate as defined in claim 9 wherein the solid substrate is a plastic material.

15. The solid substrate as defined in claim 14 wherein the plastic material is selected from the group consisting of acrylic resin, polycarbonate resin, allyl diglycol carbonate resin, polyester resin, polyamide resin, polystyrene resin and cellulose ester resin.

16. A solid substrate having a glow-discharge-treated, abrasion-resistant cross-linked organosiloxane coating thereon, said abrasion resistant coating comprising the cross-linked condensation product of organosilanol molecules of the formula $R'_m Si(OH)_{4-m}$ or a precursor of said organosilanol or a partial hydrolysis product thereof, where m is 1 or 2 and R' is each independently a hydrocarbon radical, wherein said organosiloxane coating has been glow discharge treated at a pressure of 5-150 microns subsequent to condensation and crosslinking and a mirror layer on said organosiloxane coating.

17. The solid substrate as defined in claim 16, wherein the solid substrate is a plastic material.

18. The solid substrate as defined in claim 17, wherein the plastic material is selected from the group consisting of acrylic resin, polycarbonate resin, allyl diglycol carbonate resin, polyester resin, polyamide resin, polystyrene resin and cellulose ester resin.

19. The solid substrate as defined in claim 16, wherein the plastic material is selected from the group consisting of arylic, polycarbonate, allyl diglycol carbonate and cellulose ester resins.

20. A solid substrate coated with a glow-discharge-treated, abrasion-resistant organosiloxane coating having siloxane cross-linkages, said coated substrate having an abrasion resistance such that the number of cycles of abrasive motion required to increase the haze value of the solid substrate by 3% is at least 500 as determined by the rubbing pad abrader test method under 100 gram load.

21. The solid substrate as defined in claim 20, wherein the solid substrate is a plastic material.

22. The solid substrate as defined in claim 21, wherein the plastic material is selected from the group consisting of acrylic resin, polycarbonate resin, allyl diglycol carbonate resin, polyester resin, polyamide resin, polystyrene resin and cellulose ester resin.

23. The solid substrate as defined in claim 1, wherein the plastic material is selected from the group consisting of acrylic, polycarbonate, allyl diglycol carbonate and cellulose ester resins.

* * * * *